(12) United States Patent  
Poole

(10) Patent No.: US 8,947,229 B1
(45) Date of Patent: Feb. 3, 2015

(54) METHOD AND APPARATUS TO CONTROL OPERATIONS OF A DEVICE BASED ON DETECTION OF A PREDETERMINED CHEMICAL SUBSTANCE

(71) Applicant: Marvell International Ltd., Hamilton (BM)

(72) Inventor: David K. Poole, Boise, ID (US)

(73) Assignee: Marvell International Ltd., Hamilton (BM)

( * ) Notice: Subject to any disclaimer, the term of this patent is extended or adjusted under 35 U.S.C. 154(b) by 180 days.

(21) Appl. No.: 13/759,974

(22) Filed: Feb. 5, 2013

Related U.S. Application Data

(60) Provisional application No. 61/604,307, filed on Feb. 28, 2012.

(51) Int. Cl.
*G08B 21/00* (2006.01)
*G08B 21/02* (2006.01)

(52) U.S. Cl.
CPC ...................................... *G08B 21/02* (2013.01)
USPC ..... 340/540; 340/500; 340/693.5; 340/636.1; 347/19; 347/86

(58) Field of Classification Search
CPC ...... G08B 21/02; G03G 15/0832; G06F 1/26; B41J 2/1754; B41J 2/17546
USPC ................ 340/540, 691.1, 691.6, 693.5, 500, 340/693.12, 636.1; 347/86, 19, 20, 85, 87; 422/430, 50, 63, 67; 73/864.33, 73/864.81; 436/91, 94, 164
See application file for complete search history.

(56) References Cited

U.S. PATENT DOCUMENTS

| | | | | |
|---|---|---|---|---|
| 6,386,694 B2 * | 5/2002 | Kawakami | ...................... | 347/86 |
| 7,697,957 B2 * | 4/2010 | Pattenden et al. | ............. | 455/557 |
| 7,948,375 B2 * | 5/2011 | Goldberg et al. | ............. | 340/540 |
| 8,461,987 B2 * | 6/2013 | Kountotsis | .................... | 340/540 |
| 2009/0256703 A1 * | 10/2009 | Bolton | .......................... | 340/540 |

* cited by examiner

*Primary Examiner* — Anh V La

(57) ABSTRACT

In an embodiment, an apparatus includes a removable portion having a material and a chemical detection system coupled with the removable portion. The chemical detection system can obtain an amount of the material from the removable portion and determine whether the amount of material obtained from the removable portion includes a predetermined substance. In response to determining that the amount of the material obtained from the removable portion includes the predetermined substance, the chemical detection system can provide a first signal to initiate a first operation of the apparatus. Additionally, in response to determining that the amount of material obtained from the removable portion does not include the predetermined substance, the chemical detection system can generate a second signal to display an alert that indicates the material is not approved by at least one of a manufacturer of the apparatus or a supplier of the apparatus.

20 Claims, 5 Drawing Sheets

METHOD AND APPARATUS TO CONTROL OPERATIONS OF A DEVICE BASED ON DETECTION OF A PREDETERMINED CHEMICAL SUBSTANCE

CROSS-REFERENCE TO RELATED APPLICATION

The present disclosure claims priority to U.S. Provisional Patent Application No. 61/604,307, filed on Feb. 28, 2012, which is incorporated herein by reference.

TECHNICAL FIELD

This disclosure relates to controlling device operations based on the detection of a predetermined chemical substance.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many devices operate with components that need to be replaced during the lifetime of the device. For example, some devices operate using consumables that need to be replaced regularly, such as ink cartridges utilized by printing devices. In other situations, components of a device wear out over time, such as batteries for mobile phones and portable computing devices. In any case, counterfeiters often attempt to replicate these components at the expense of the manufacturers and suppliers of these components. Use of counterfeit components that are not approved by a manufacturer or supplier of the device may result in faulty operation of the device. In particular instances, the use of counterfeit components in a device may present a safety risk for users of the device.

SUMMARY

In accordance with an embodiment, an apparatus includes a removable portion that includes a material and a chemical detection system coupled with the removable portion. The chemical detection system is configured to obtain an amount of the material from the removable portion and determine whether the amount of material obtained from the removable portion includes a predetermined substance. Additionally, the chemical detection system is configured to provide a first signal to a processor of the apparatus to initiate a first operation of the apparatus in response to determining that the amount of the material obtained from the removable portion includes the predetermined substance. Further, the chemical detection system is configured to generate a second signal to display an alert in response to determining that the amount of material obtained from the removable portion does not include the predetermined substance. The alert indicates that the material is not approved by at least one of a manufacturer of the apparatus or a supplier of the apparatus.

Additionally, in accordance with an embodiment, a method includes obtaining by a chemical detection system of an electronic device, an amount of a material from a removable portion of the electronic device and determining, by the chemical detection system, whether the obtained amount of the material includes a predetermined substance. The method also includes, providing, by the chemical detection system, a first signal to a processor of the electronic device to initiate a first operation of the electronic device in response to determining that the obtained amount of the material includes the predetermined substance. Further, the method includes providing, by the chemical detection system, a second signal to the processor to initiate a second operation of the electronic device in response to determining that the obtained amount of the material does not include the predetermined substance.

Further, in accordance with an embodiment, an apparatus includes a removable portion that includes a particular material and a chemical detection system including a first reactive material. The first reactive material is capable of reacting with a second reactive material within a particular amount of time to produce a third material upon physical contact between the first reactive material and the second reactive material. In addition, the chemical detection system is configured to obtain an amount of the particular material from the removable portion and determine whether the particular material includes the second reactive material based on whether a sensor of the chemical detection system detects the third material when the first reactive material physically contacts the particular material. Further, the chemical detection system includes a controller configured to, in response to the sensor being unable to detect the third material, generate a signal indicating that the sensor is unable to detect the third material. The chemical detection system also includes a processor configured to, in response to receiving the signal from the controller, produce a user interface displaying an alert that indicates the removable portion is not approved by at least one of a manufacturer of the apparatus or a supplier of the apparatus.

BRIEF DESCRIPTION OF THE DRAWINGS

Embodiments of the present disclosure will be readily understood by the following detailed description in conjunction with the accompanying drawings. To facilitate this description, like reference numerals designate like elements.

DETAILED DESCRIPTION

Described herein are example systems, components, and methods of detecting a predetermined substance to control operations of a device. The following description merely provides examples and is in no way intended to limit the present disclosure, its application, or uses.

Manufacturers of components of some consumer electronic devices have turned to electronic verification techniques in an attempt to decrease the proliferation of counterfeit components for these devices. In some cases, counterfeiters have reverse engineered the electronic verification techniques to circumvent anti-counterfeiting measures. Thus, the effectiveness of electronic verification techniques to deter production of counterfeit components is somewhat limited.

This disclosure is directed to detecting a predetermined substance and controlling operations of an apparatus based on whether or not the predetermined substance is detected. Chemical verification techniques are often more difficult to reverse engineer and circumvent than electronic verification techniques. Thus, chemical verification techniques can be utilized to more effectively deter the production of counterfeit components of devices that are depleted or wear out over time.

Figure 1:
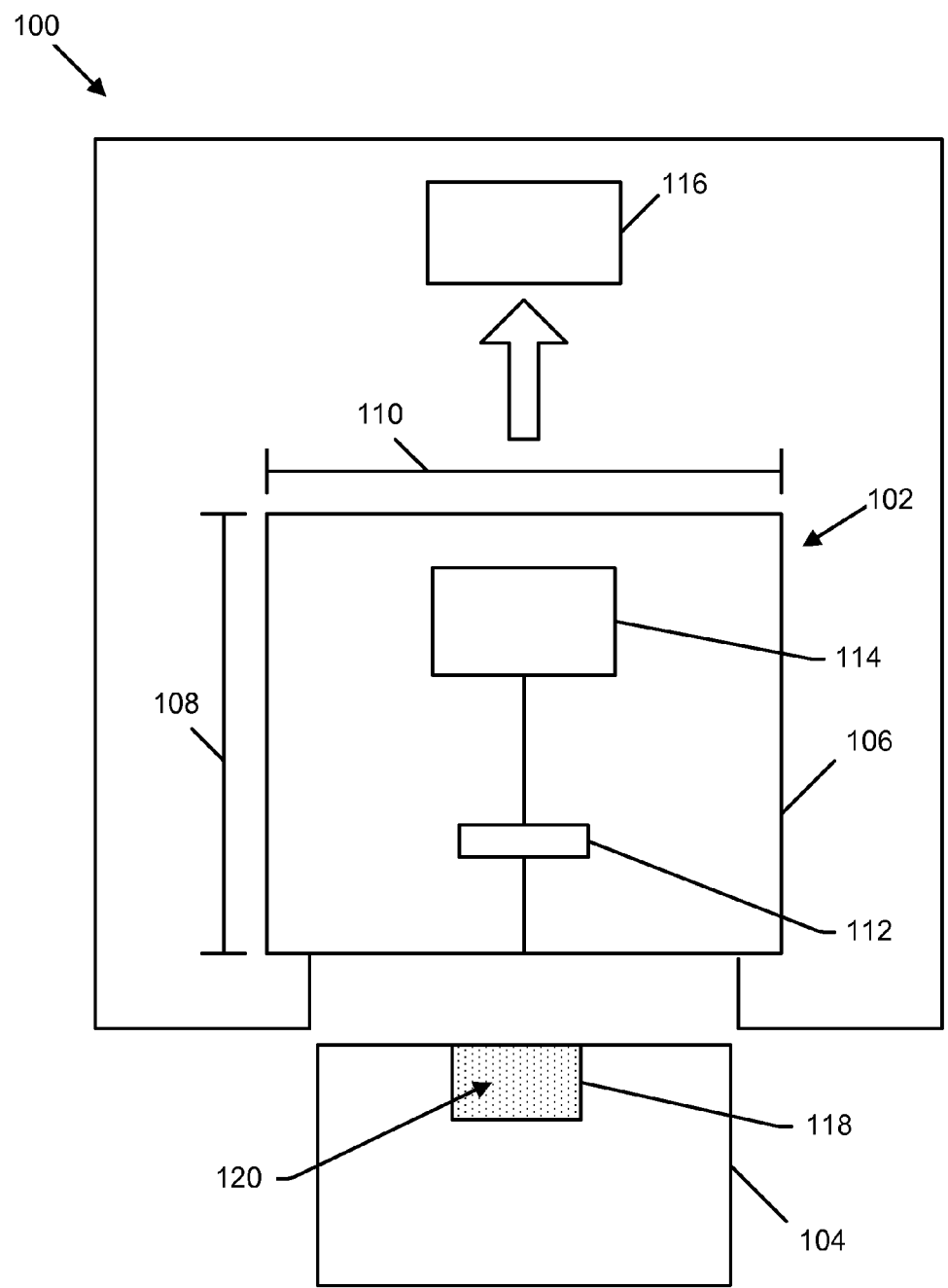
FIG. 1 is a block diagram illustrating a first embodiment of an apparatus including a chemical detection system to detect a predetermined substance and a removable portion that is de-coupled from the chemical detection system.

FIG. 1 is a block diagram illustrating a first embodiment of an apparatus 100 including (i) a chemical detection system 102 to detect a predetermined substance and a (ii) removable portion 104 that is de-coupled from the apparatus 100. In some cases, the apparatus 100 includes an electronic device. For example, the apparatus 100 can include a printing device, such as an ink jet printer, a laser printer, or a solid ink printer, and the removable portion 104 can include an ink cartridge for the printing device. In another example, the apparatus 100 can include an imaging device (e.g., a camera), a mobile communications device (e.g., mobile phone, smartphone), a computing device (e.g., tablet computer, laptop computer), a media player, a gaming device, combinations thereof, and the like, and the removable portion 104 can include, for example, a battery of the apparatus 100.

The chemical detection system 102 includes microelectromechanical features formed on a substrate 106. In an embodiment, the substrate 106 includes a polymeric material. In a particular embodiment, the substrate 106 includes a resin material, a thermoplastic material, or an elastomeric material. In an illustrative embodiment, the substrate 106 includes a polyimide, a polymethamethylacrylate, a poly(dimethylsiloxane), a polyethylene, a polyvinylchloride, a polypropylene, an acrylonitrile-butadiene-styrene copolymer, a cyclic olefin copolymer, a polycarbonate, or a combination thereof. In another embodiment, the substrate 106 includes a silicon-containing material. For example, the substrate 106 can include silica, a glass, a quartz, or a combination thereof. In some cases, the substrate 106 includes a combination of the polymeric material and a silicon-containing material.

The substrate 106 includes a length 108 and a width 110. In an embodiment, the length 108 is no greater than 50 mm, no greater than 35 mm, or no greater than 20 mm. In another embodiment, the length 108 is at least 0.25 mm, at least 1 mm, or at least 10 mm. In an illustrative non-limiting embodiment, the length 108 is within a range of 1 mm to 40 mm. In another illustrative non-limiting embodiment, the length 108 is within a range of 5 mm to 25 mm. Additionally, in an embodiment, the width 110 is no greater than 50 mm, no greater than 35 mm, or no greater than 20 mm. In other embodiments, the width 110 is at least 0.25 mm, at least 1 mm, or at least 10 mm. In a particular illustrative non-limiting embodiment, the width is within a range of 1 mm to 40 mm. In an additional illustrative non-limiting embodiment, the width 110 is within a range of 5 mm to 25 mm.

The microelectromechanical features formed on the substrate 106 can include conduits, valves, reservoirs, columns, mixing regions, channels, sensors, buffers, pumps, combinations thereof, and the like. In some cases, at least a portion of the microelectromechanical features formed on the substrate 106 are passive features, while in other cases, at least a portion of the microelectromechanical features formed on the substrate 106 are active features.

In a particular embodiment, features formed on the substrate 106 have dimensions, such as length, width, diameter, height. In an embodiment, one or more of the dimensions have values that are no greater than 100 microns, no greater than 75 microns, no greater than 50 microns, no greater than 20 microns, or no greater than 10 microns. In another particular embodiment, the features formed on the substrate 106 have one or more dimensions with values that are at least 5 nm, at least 100 nm, at least 250 nm, or at least 500 nm. In a non-limiting illustrative embodiment, at least a portion of the features formed on the substrate 106 have one or more dimensions with values within a range of 25 nm to 400 microns. In another non-limiting illustrative embodiment, at least a portion of the features formed on the substrate 106 have one or more dimensions with values within a range of 100 nm to 25 microns.

In an illustrative embodiment of FIG. 1, the chemical detection system 102 includes a sensor 112. In an embodiment, the sensor 112 includes an electrode. In an embodiment, the sensor 112 includes a metal containing material, such as gold, aluminum, chromium, platinum, or a combination thereof. In another embodiment, the sensor 112 includes a photosensor, such as a photodiode. Additionally, in the illustrative embodiment of FIG. 1, the chemical detection system 102 includes a controller 114. In some cases, the controller 114 can control operations of features of the chemical detection system 102. For example, the controller 114 activates a pump of the chemical detection system 102, operates a flow control device of the chemical detection system 102, provides current to a feature of the chemical detection system 102, establishes a voltage for a feature of the chemical detection system 102, operates a switch of the chemical detection system 102, controls a temperature of one or more features of the chemical detection system 102, controls a pressure with respect to one or more features of the chemical detection system 102, or a combination thereof. In other situations, the controller 114 can receive input from features of the chemical detection system 102, such as the sensor 112, to determine whether a predetermined substance has been detected. In an embodiment, the controller 114 includes circuitry to implement operations of the controller 114. In another embodiment, the operations of the controller 114 can be implemented via software, firmware, or a combination thereof.

In a particular embodiment, the controller 114 is in communication with other components of the apparatus 100. For example, in the illustrative embodiment of FIG. 1, the apparatus 100 includes a processor 116 in communication with the chemical detection system 102. In some scenarios, the controller 114 generates signals to the processor 116 indicating the detection of a predetermined substance by the chemical detection system 102. For example, in response to receiving a signal from the controller 114 that the predetermined substance is detected by the chemical detection system 102, the processor 116 enables the apparatus 100 to operate without any warnings or restrictions. In this way, the processor 116 enables the apparatus to use the removable portion 104 without any warnings or restrictions. In other cases, the controller 114 generates signals to the processor 116 indicating that a predetermined substance has not been detected by the chemical detection system 102. The processor 116 then initiates particular operations of the apparatus 100 based on the input received from the chemical detection system 102. In one example, the processor 116 invokes software of the apparatus 100 to provide a user interface displaying an alert that a component that has been coupled to the apparatus 100 does not meet particular specifications. In another example, the processor 116 operates to disable functionality of the apparatus 100. In a particular embodiment, the controller 114 generates a signal to send to the processor 116 when the sensor 112 is unable to detect the predetermined substance for a predetermined amount of time after coupling the removable portion 104 to the chemical detection system 102.

The removable portion 104 includes a container 118, such as a reservoir, chamber, or other receptacle, that includes a material 120. In some cases, the material 120 includes a liquid, while in other cases the material 120 includes a solid. In still other situations, the material 120 includes a gas. In a particular embodiment, the material 120 includes a plurality of substances and at least one of the substances is the predetermined substance that the chemical detection system 102 is configured to detect. In another particular embodiment, the material 120 includes a precursor of the predetermined substance that the chemical detection system 102 is configured to detect.

Figure 2:
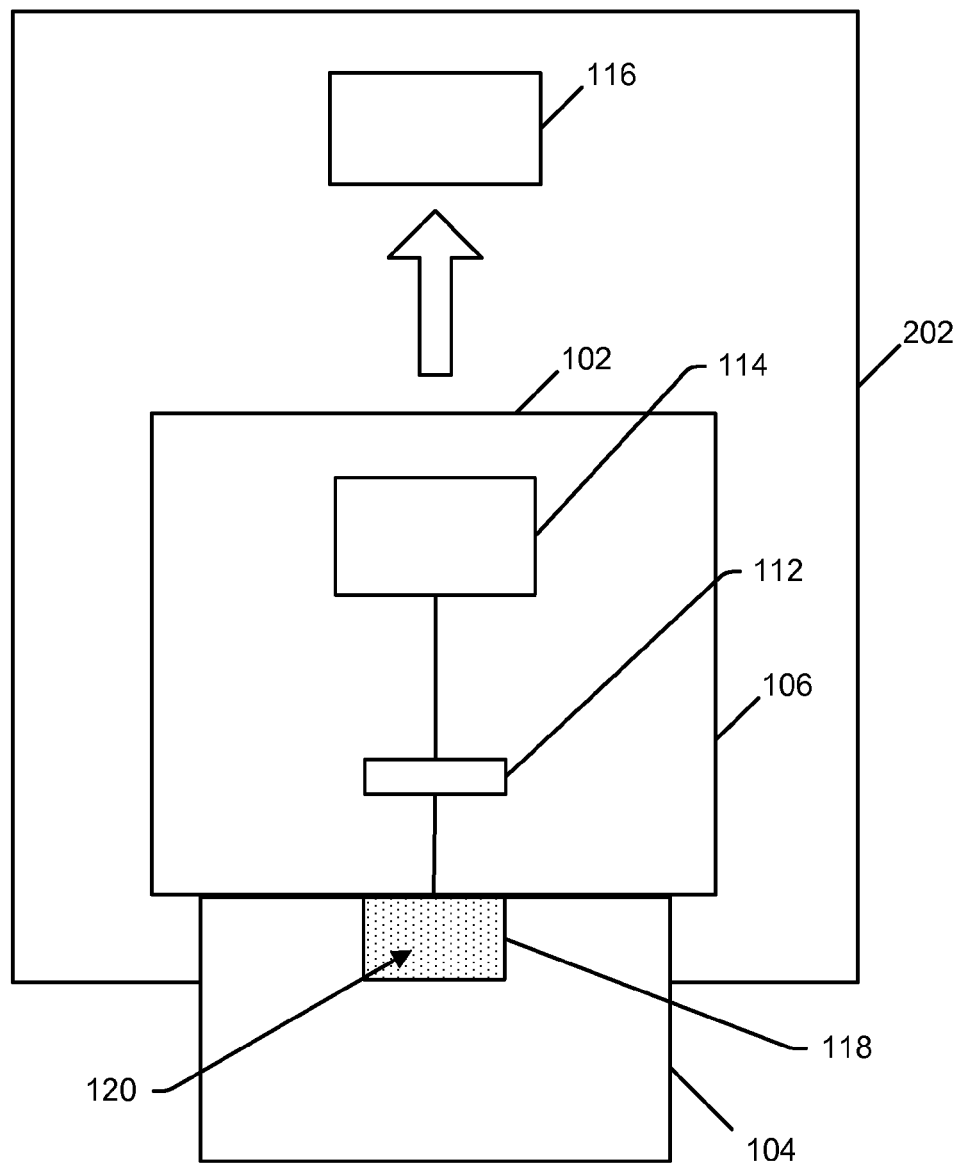
FIG. 2 is a block diagram illustrating a second embodiment of an apparatus including a chemical detection system to detect a predetermined substance and a removable portion that is coupled with the chemical detection system.

FIG. 2 is a block diagram illustrating a second embodiment of an apparatus 100 including a chemical detection system 102 to detect a predetermined substance and a removable portion 104 that is coupled with the chemical detection system 102. In an embodiment, the removable portion 104 is coupled with the chemical detection system 102 via an attachment system. In some cases, the attachment system can be formed from surfaces of a housing 202 of the apparatus 100, surfaces of the removable portion 104, or both. For example, one or more surfaces of the housing 202, one or more surfaces of the removable portion 104, or both, can be threaded. In other cases, the attachment system may include one or more fasteners, one or more clips, one or more pins, one or more pin receptors, one or more slots, combinations thereof, and the like. In a particular embodiment, a portion of the housing 202 and a portion of a surface of the removable portion 104 are in direct physical contact.

In an illustrative embodiment, when the removable portion 104 is coupled with the chemical detection system 102, the chemical detection system 102 can receive an amount of material 120 from the removable portion 104. In one embodiment, the amount of the material 120 is obtained by operating features of the chemical detection system 102. For example, a pump of the chemical detection system 102, a flow control device of the chemical detection system 102, or both can be operated to obtain an amount of the material 120. In another embodiment, the amount of the material 120 is obtained by operating features of the removable portion 104. To illustrate, a pump of the removable portion 104, a flow control device of the removable portion 104, a nozzle of the removable portion 104, or a combination thereof, are operated to provide an amount of the material 120 to the chemical detection system 102. In an additional embodiment the amount of the material 120 can be provided to the chemical detection system 102 via capillary action.

In an embodiment, when the removable portion 104 is coupled with the chemical detection system 102, the chemical detection system 102 sends a signal to the removable portion 104 to operate features of the removable portion 104 to provide an amount of the material 120 to the chemical detection system 102. In another embodiment, the controller 114 determines that the removable portion 104 has been coupled with the chemical detection system 102 and the controller 114 then activates one or more features of the chemical detection system 102 to obtain an amount of the material 120 from the removable portion 104. In a particular embodiment, the amount of the material 120 obtained from the removable portion 104 is no greater than 100 microliters, no greater than 10 microliters, no greater than 500 nanoliters, no greater than 100 nanoliters, no greater than 10 nanoliters, no greater than 0.5 nanoliters, no greater than 0.1 nanoliters, or no greater than 0.05 nanoliters. In a non-limiting illustrative embodiment, the amount of the material 120 obtained from the removable portion 104 is within a range of 1 nanoliter to 1000 nanoliters. In another non-limiting illustrative embodiment, the amount of the material 120 obtained from the removable portion 104 is within a range of 50 nanoliters to 250 nanoliters. In some embodiments, the amount of the material 120 obtained from the removable portion 104 is no greater than 100 micrograms, no greater than 50 micrograms, no greater than 10 micrograms, no greater than 5 micrograms, no greater than 1 microgram, no greater than 0.5 micrograms, or no greater than 0.1 micrograms. In an additional non-limiting illustrative embodiment, the amount of the material 120 obtained from the removable portion 104 is within a range of 0.1 micrograms to about 25 micrograms.

In a particular embodiment, the material 120 includes a plurality of constituents and the predetermined substance that the chemical detection system 102 is configured to detect is one of the constituents of the material 120. In some cases, the constituent of the material 120 detected by the chemical detection system 102 is included in the material 120 to contribute to the functionality of the material 120. For example, the chemical detection system 102 is configured to detect particular particles of a dye when the apparatus 100 includes a printing device and the material 120 is ink utilized by the printing device. In other cases, the constituent of the material 120 detected by the chemical detection system 102 is an additive of the material 120. To illustrate, a particular constituent can be added to ink utilized by a printing device specifically for detection by the chemical detection system 102.

Additionally, in an embodiment, the chemical detection system 102 is configured to detect a product of a reaction between a first reactant included in the material 120 and one or more additional reactants provided by the chemical detection system 102. In some cases, the chemical detection system 102 is configured to detect a predetermined substance based, at least in part, on conditions of a reaction between the material 120 and a reactant provided by the chemical detection system 102. For example, the predetermined substance can be detected based on an amount of heat that is produced when the material 120 is reacted with one or more additional substances provided by the chemical detection system 102.

In one embodiment, the chemical detection system 102 detects the predetermined substance based, at least in part, on physical properties of the material, physical properties of the predetermined substance, or both. For example, the chemical detection system 102 detects the predetermined substance based on particle size, density, molecular weight, melting point, pH, viscosity, or a combination thereof. In another embodiment, the chemical detection system 102 detects the predetermined substance based, at least in part, on one or more chemical moieties of the constituents of the material 120. In an additional embodiment, the chemical detection system 102 detects the predetermined substance based, at least in part, on optical properties of the material 120. To illustrate, the chemical detection system 102 can detect the predetermined substance based on the absorption of particular wavelengths by the material 120.

In an embodiment, the predetermined substance is detected by the chemical detection system 102 using separation techniques. In some cases, the predetermined substance is detected by the chemical detection system 102 using chromatography. In other instances, the predetermined substance is detected by the chemical detection system 102 using one or more filters. In one example, a filter separates particles based on a size of the particles, such as a diameter of the particles.

In an illustrative example, the apparatus 100 includes a printing device and the material 120 is a printing substance held by the container 118 of the removable portion 104. In some cases, the removable portion 104 includes an ink jet printer cartridge and the printing substance includes a liquid, such as an ink, to form images on a printing medium, such as paper. In other cases, the removable portion 104 includes a toner cartridge and the printing substance includes solid toner particles to form images on a printing medium. Continuing with this illustrative example, when the removable portion 104 is coupled with the chemical detection system 102, the chemical detection system 102 then obtains an amount of the material 120 from the removable portion 104 and determines whether a predetermined substance is detected. In response to whether or not the predetermined substance is detected by the chemical detection system 102, the controller 114 initiates a process to perform a specified operation. In a particular illustrative embodiment, when the predetermined substance is absent from the material 120, the controller 114 may be in communication with the processor 116 to provide a user interface displaying an alert that the material 120 is not approved by a manufacturer of the apparatus 100, a supplier of the apparatus 100, or both.

In another illustrative example, the apparatus 100 includes a mobile communication device (e.g., mobile phone, smart phone, etc.) or a portable computing device (e.g., tablet computing device, laptop computing device, etc.) and removable portion 104 includes a battery. Continuing with this illustrative example, when the removable portion 104 is coupled with the chemical detection system 102, the chemical detection system 102 can obtain an amount of the material 120 from the container 118 of the removable portion 104. The chemical detection system 102 then determines whether or not the material 120 includes a predetermined substance. In a particular illustrative embodiment, when the predetermined substance is absent from the material 120, the controller 114 may be in communication with the processor 116 to perform specified operations. To illustrate, in response to receiving a signal from the controller 114 that the predetermined substance is not included in the material 120, the processor 116 may provide a user interface indicating that a battery that is not approved by the manufacturer of the apparatus 100, the supplier of the apparatus 100, or both, has been coupled to the housing 202. In another illustration, the processor 116 limits a functionality of the apparatus 100 in response to receiving a signal from the controller 114 that the material 120 does not include the predetermined substance. For example, the processor 114 can cause the apparatus 100 to shut down, to enter a sleep mode, to operate for a limited amount of time, or a combination thereof, in response to receiving a signal from the controller 114 that the material 120 does not include the predetermined substance.

Although embodiments previously described herein with respect to FIG. 1 and FIG. 2 have been directed to the chemical detection system 102 obtaining an amount of the material 120, in other embodiments, the chemical detection system 102 can be configured to determine when particular substances contact each other. For example, a first substance can be applied to an outer portion of the housing 202 of the apparatus 100 and a second substance can be applied to an outer portion of the removable portion 104. When the removable portion 104 is coupled with the housing 202, the first substance and the second substance can directly contact each other. In an embodiment, the chemical detection system 102 is configured to detect a particular product that results from direct contact between the first substance and the second substance. The particular product can include heat, another substance formed by a reaction between the first substance and the second substance, or both.

Additionally, although in some cases, the processor 116 performs a particular operation in response to receiving a single signal from the controller 114 regarding whether or not a predetermined substance has been detected by the chemical detection system 102, in other instances, the processor 116 performs the particular operation after a plurality of instances of the chemical detection system 102 obtaining an amount of the material 120 and determining whether the material 120 includes the predetermined substance. In an illustrative embodiment, the processor 116 initiates specified operations upon receiving one or more indications from the controller 114 that the predetermined substance has been detected in a threshold number of samples of the material 120 obtained from the removable portion 104. In another illustrative embodiment, the processor 116 initiates particular operations in the absence of receiving one or more indications from the controller 114 that a threshold number of samples including the predetermined substance have been obtained within a particular period of time, within a particular total number of samples analyzed, or both.

In some cases, the predetermined substance varies according to specifications set by a manufacturer of the apparatus 100, suppliers of the apparatus 100, or both. For example, a manufacturer and/or supplier of the apparatus 100 can specify that particular models of the apparatus 100 are configured to detect a first predetermined substance, while other models of the apparatus are configured to detect a second predetermined substance. In other cases, the apparatus 100 can receive updates indicating that the removable portion 104 includes one or more additional predetermined substances or a different predetermined substance. Consequently, the updates can be applied to the chemical detection system 102 such that the chemical detection system 102 is modified to be configured to detect the additional predetermined substance or the different predetermined substances. In this way, manufacturers and/or suppliers of the apparatus 100 can further limit the number of counterfeit components used with respect to the apparatus 100 by varying the predetermined substance to be detected by the chemical detection system 102.

Figure 3:
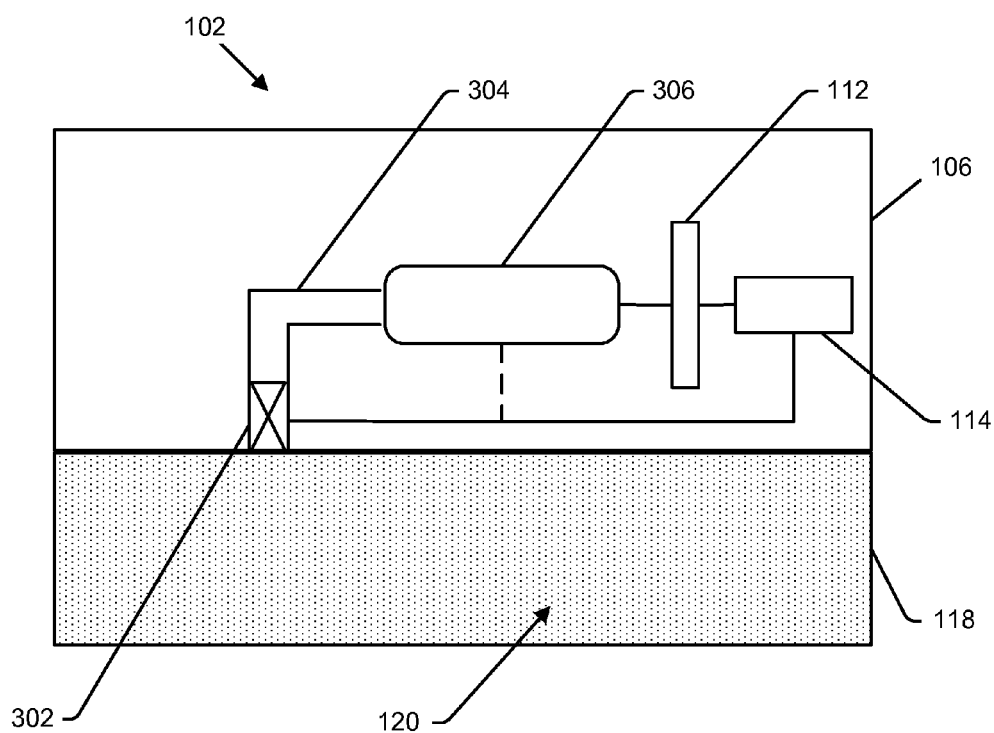
FIG. 3 is a diagram illustrating a first embodiment of a chemical detection system to detect a predetermined substance provided by a removable portion of an apparatus coupled with the chemical detection system.

FIG. 3 is a diagram illustrating a first embodiment of a chemical detection system 102 to detect a predetermined substance provided by a removable portion of an apparatus, such as the apparatus 100 of FIG. 1 and FIG. 2, coupled with the chemical detection system 102. In the illustrative embodiment of FIG. 3, the chemical detection system 102 includes a substrate 106 with a number of features formed on the substrate 106. For example, the substrate 106 includes a flow control device 302, such as a valve, a conduit 304, and a chamber 306. In some cases, the chamber 306 is a separation chamber where one or more constituents of a material can be physical separated, chemically separated, or both. In other cases, the chamber 306 is a reaction chamber where one or more products are formed as a result of a reaction between a number of reactants. In still additional instances, the chamber 306 includes one or more filters to filter one or more components of a substance.

The substrate 106 also includes a sensor 112 and a controller 114. In an embodiment, the controller 114 communicates with other components of an apparatus, such as a processor, and also controls the operation of features of the chemical detection system 102, such as the flow control device 302 and, in certain situations, the chamber 306. For example, the controller 114 can control an opening and closing of the flow control device 302 to allow an amount of a material to be provided to the chemical detection system 102. To illustrate, the controller 114 can operate the flow control device 302 to open for a predetermined amount of time to allow a specified amount of a material to be provided to the chemical detection system 102.

The chemical detection system 102 can also include a number of other features that are not shown in FIG. 3, such as one or more pumps, one or more additional conduits, one or more additional flow control devices, one or more additional chambers, one or more additional sensors, one or more additional controllers, combinations thereof, and the like. For example, in an embodiment, the chemical detection system 102 includes a waste disposal system including one or more features to store waste from a separation process, waste from a reaction process, and/or waste from a filtering process. In another example, the chemical detection system 102 includes one or more features for rinsing other features of the chemical detection system 102. The chemical detection system 102 can also include a pump to obtain the material 120 from a container 118.

The chemical detection system 102 can also include a number of instances of the illustrative layout of the chemical detection system 102 of FIG. 3. For example, the chemical detection 102 can include a number of flow control devices, such as the flow control device 302, formed at respective locations on the substrate 106 where the flow control devices are coupled to respective chambers, such as the chamber 306, via respective conduits, such as the conduit 304. The chemical detection system 102 can also include additional sensors, such as the sensor 112, coupled to respective chambers and additional controllers, such as the controller 114, coupled to respective sensors. In some instances, multiple sensors are coupled to a single controller. Additionally, in some scenarios, multiple chambers are coupled to a single sensor. Furthermore, in some situations, the chemical detection system 102 includes a series of chambers coupled to the sensor 112 to perform separation functions, filtering functions, reaction functions, or a combination thereof.

In an illustrative example, the chemical detection system 102 is coupled with the container 118 that includes the material 120. Continuing with this example, an amount of the material 120 is provided to the chemical detection system 102 upon operating the flow control device 302. Upon entering the chemical detection system 102, the amount of the material 120 travels through the conduit 304 to the chamber 306. The sensor 112 then detects whether a predetermined substance is included in or formed from the amount of the material 120 obtained by the chemical detection system 102. Subsequently, the controller 114 communicates one or more signals to other components of an apparatus including the chemical detection system 102 to perform specified operations.

Figure 4:
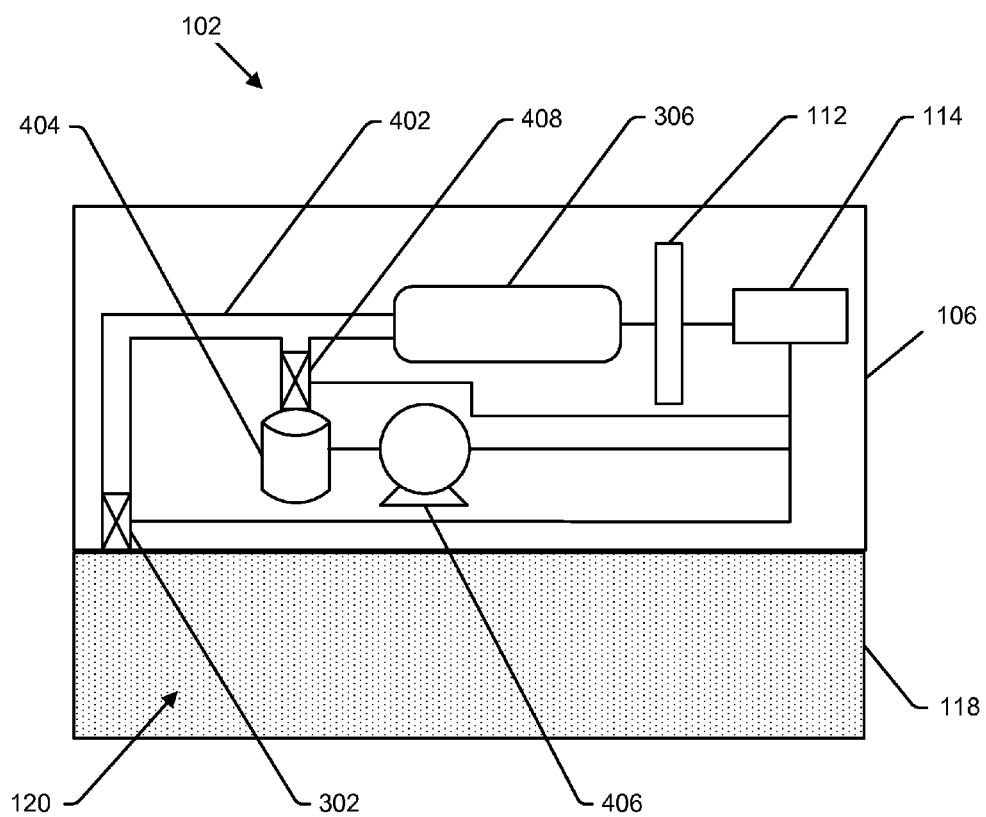
FIG. 4 is a diagram illustrating a second embodiment of a chemical detection system of an apparatus to detect a predetermined substance that is formed by a reaction between a first reactive material and a second reactive material.

FIG. 4 is a diagram illustrating a second embodiment of a chemical detection system 102 of an apparatus to detect a predetermined substance that is formed by a reaction between a first reactive material and a second reactive material. In the illustrative embodiment of FIG. 4, the chemical detection system 102 includes the substrate 106 with a number of features formed on the substrate 106. For example, the substrate 106 includes a flow control device 302, such as a valve, a conduit 402, and a chamber 306. The substrate 106 also includes a container 404, a pump 406, and an additional flow control device 408. In some cases, the container 404 includes a rinsing agent to rinse the chamber 306. In other situations, the container 404 includes a reactive material to be provided to the chamber 306.

In an illustrative example, the chemical detection system 102 is coupled with the container 118 that includes the material 120. Continuing with this example, the controller 114 controls the flow control device 302 to provide an amount of the material 120 to the chemical detection system 102. The amount of the material 120 then travels through the conduit 402 to the chamber 306. As the amount of the material 120 flows through the conduit 402 and into the chamber 306, the controller 114 operates the pump 406 and the additional flow control device 408 to provide an amount of an additional material stored in the reservoir 404 to the chamber 306. In this way, the controller 114 operates features of the chemical detection system 102 to provide a first reactive material (i.e., the material stored in the reservoir 404) and the material 120 to the chamber 306 that react to form one or more products. In particular embodiments, the material 120 can include a second reactive material and the one or more products can include a third material. The third material can be the predetermined substance that the sensor 112 is configured to detect. Additionally, in some cases, the first reactive material and the second reactive material are capable of reacting within a particular amount of time to produce the third material upon physical contact between the first reactive material and the second reactive material. In a particular embodiment, the particular amount of time is no greater than 30 seconds, no greater than 15 seconds, no greater than 5 seconds, no greater than 1 second, no greater than 0.1 seconds, or no greater than 0.01 seconds. In an illustrative non-limiting embodiment, the specified duration may be within a range of 0.05 seconds to 10 seconds. Furthermore, the controller 114 can communicate with other components of an apparatus including the chemical detection system 102 to perform specified operations based, at least in part, on whether the predetermined substance is detected by the sensor 112.

Figure 5:
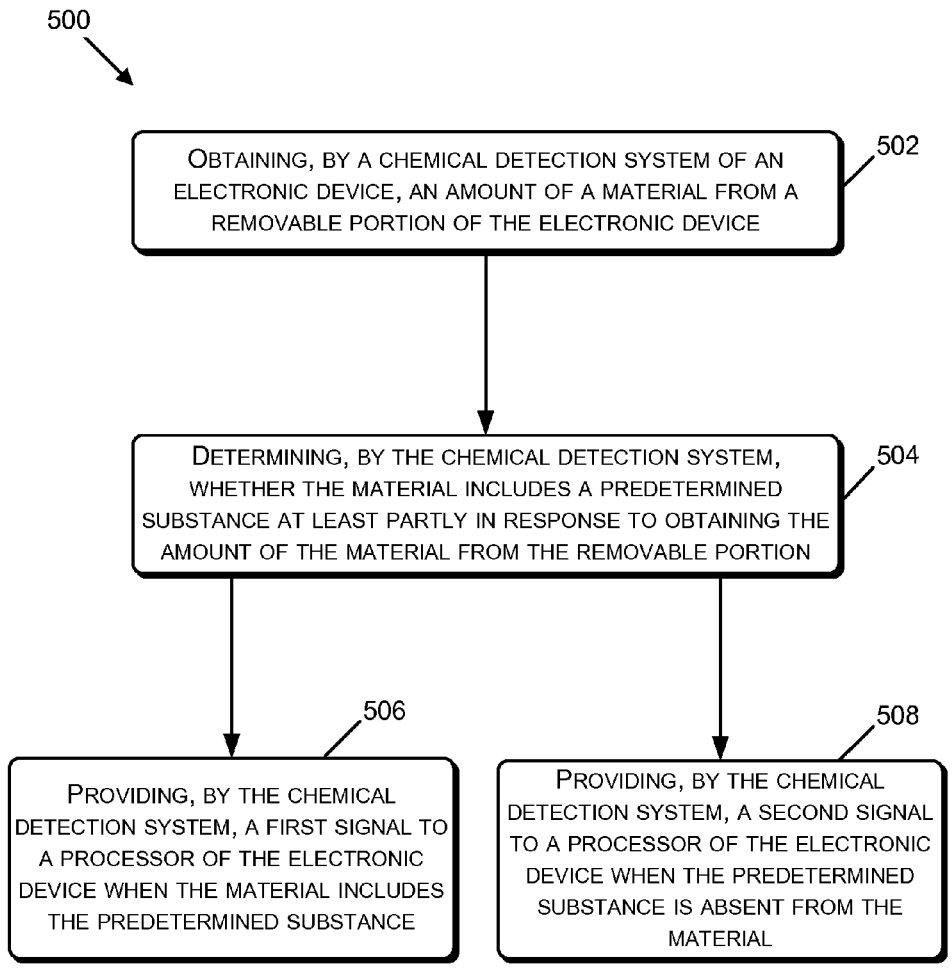
FIG. 5 is a flowchart illustrating an example method to control operations of an electronic device based, at least in part, on the detection of a predetermined substance.

FIG. 5 is a flowchart illustrating an example method 500 to control operations of an electronic device based, at least in part, on the detection of a predetermined substance. At 502, the method 500 includes obtaining, by a chemical detection system of an electronic device, an amount of a material from a removable portion of the electronic device. For example, a controller of the chemical detection system can operate a pump and/or a flow control device of the chemical detection system to obtain an amount of a material from the removable portion of the electronic device. In some cases, the electronic device can be a printing device and the removable portion includes an ink cartridge or a toner container. In other cases, the electronic device can be a portable computing device and the removable portion includes a battery.

At 504, the method 500 includes determining, by the chemical detection system, whether the material includes a predetermined substance at least partly in response to obtaining the amount of the material from the removable portion. In an embodiment, the chemical detection system includes a sensor to detect the predetermined substance. The sensor can detect the predetermined substance based, at least in part, on physical properties of the predetermined substance, chemical moieties of the predetermined substance, optical properties of the predetermined substance, or a combination thereof.

Additionally, in a particular embodiment, the predetermined substance is one substance of a number of substances of the material. Thus, the chemical detection system can include one or more components to physically separate the constituents of the material, such that the predetermined substance is detected by the sensor. In an additional embodiment, the chemical detection system includes one or more components to chemically separate the constituents of the material, such that the predetermined substance is detected by the sensor. In some instances, the predetermined substance can be detected by the sensor when the predetermined substance contacts the sensor.

In other embodiments, the chemical detection system includes a reaction chamber to produce one or more products from a reaction between a number of reactants. In particular scenarios, the chemical detection system is configured to detect a product of the reaction. In some cases, the chemical detection system physically separates the products of the reaction to provide the predetermined substance to the sensor, while in other situations, the chemical detection system chemically separates the products of the reaction to provide the predetermined substance to the sensor. In one embodiment, the product of the reaction detected by the sensor is heat generated by the reaction.

At 506, the method 500 includes providing, by the chemical detection system, a first signal to a processor of the electronic device to initiate a first operation of the electronic device in response to determining that the material includes the predetermined substance. In addition, at 508, the method 500 includes providing, by the chemical detection system, a second signal to the processor to initiate a second operation of the electronic device in response to determining that the predetermined component is absent from the substance, where the second operation is different from the first operation. In some embodiments, in response to receiving the first signal, the processor is configured to enable functions of the electronic device. In this way, the processor allows the electronic device to be fully functional and operate without any warnings or restrictions. In other embodiments, in response to receiving the second signal, the processor is configured to provide a user interface that displays an alert indicating that the removable portion is not approved by a manufacturer and/or by a supplier of the electronic device. In other embodiments, in response to receiving the second signal, the processor is configured to disable a function of the electronic device, such as shutting down the electronic device or initiating a sleep mode of the electronic device.

Note that the description above incorporates use of the phrases "in an embodiment," or "in various embodiments," or the like, which may each refer to one or more of the same or different embodiments. Furthermore, the terms "comprising," "including," "having," and the like, as used with respect to embodiments of the present disclosure, are synonymous.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This application is intended to cover any adaptations or variations of the embodiments discussed herein. Therefore, it is manifestly intended that embodiments in accordance with the present disclosure be limited only by the claims and the equivalents thereof.

What is claimed is:

1. An apparatus comprising:
   a removable portion that includes a material; and
   a chemical detection system coupled with the removable portion, wherein the chemical detection system is configured to
   obtain an amount of the material from the removable portion;
   determine whether the amount of material obtained from the removable portion includes a predetermined substance;
   in response to determining that the amount of the material obtained from the removable portion includes the predetermined substance, providing, by the chemical detection system, a first signal to a processor of the apparatus to initiate a first operation of the apparatus;
   in response to determining that the amount of material obtained from the removable portion does not include the predetermined substance, generate a second signal to display an alert that indicates the material is not approved by at least one of a manufacturer of the apparatus or a supplier of the apparatus.

2. The apparatus of claim 1, wherein:
   the chemical detection system comprises a controller configured to provide the second signal to display the alert; and
   in response to the processor receiving the second signal from the controller to display the alert, the processor provides a user interface displaying the alert.

3. The apparatus of claim 1, wherein the apparatus includes a printing device and the removable portion includes an ink cartridge or a toner container.

4. The apparatus of claim 1, wherein the apparatus includes a portable computing device and the removable portion includes a battery.

5. The apparatus of claim 1, wherein the chemical detection system includes:
   a flow control device, wherein the obtaining the amount of the material from the removable portion includes operating the flow control device; and
   a sensor to detect the predetermined substance.

6. The apparatus of claim 1, further comprising a chamber to chemically separate constituents of the material.

7. The apparatus of claim 1, further comprising a chamber to physically separate constituents of the material.

8. The apparatus of claim 1, wherein the removable portion includes a container to store the material.

9. A method comprising:
   obtaining, by a chemical detection system of an electronic device, an amount of a material from a removable portion of the electronic device;
   determining, by the chemical detection system, whether the obtained amount of the material includes a predetermined substance;
   in response to determining that the obtained amount of the material includes the predetermined substance, providing, by the chemical detection system, a first signal to a processor of the electronic device to initiate a first operation of the electronic device; and
   in response to determining that the obtained amount of the material does not include the predetermined substance, providing, by the chemical detection system, a second signal to the processor to initiate a second operation of the electronic device.

10. The method of claim 9, wherein the chemical detection system is configured to determine whether the predetermined substance is included in the material, based at least in part, on physical properties of the predetermined substance.

11. The method of claim 10, wherein the physical properties of the predetermined substance include particle size, density, molecular weight, or a combination thereof.

12. The method of claim 9, wherein the chemical detection system is configured to determine whether the predetermined substance is included in the material, based at least in part, on chemical moieties of the predetermined substance.

13. The method of claim 9, wherein the chemical detection system is configured to determine whether the predetermined substance is included in the material, based at least in part, on optical properties of the predetermined substance.

14. The method of claim 9, wherein the first operation includes enabling the electronic device to use the removable portion without any warnings or restrictions.

15. The method of claim 9, wherein the second operation includes providing a user interface that displays an alert that indicates the material is not approved by at least one of a manufacturer of the electronic device or a supplier of the electronic device.

16. The method of claim 9, wherein the second operation includes disabling a function of the electronic device.

17. An apparatus comprising:
a removable portion that includes a particular material;
a chemical detection system including a first reactive material, wherein:
the first reactive material is capable of reacting with a second reactive material within a particular amount of time to produce a third material upon physical contact between the first reactive material and the second reactive material,
the chemical detection system is configured to obtain an amount of the particular material from the removable portion,
the chemical detection system is configured to determine whether the particular material includes the second reactive material based on whether a sensor of the chemical detection system detects the third material when the first reactive material physically contacts the particular material, and
the chemical detection system includes (i) a controller configured to, in response to the sensor being unable to detect the third material, generate a signal indicating that the sensor is unable to detect the third material and (ii) a processor configured to, in response to receiving the signal from the controller, produce a user interface displaying an alert that indicates the removable portion is not approved by at least one of a manufacturer of the apparatus or a supplier of the apparatus.

18. The apparatus of claim 17, wherein the controller is configured to generate the signal when the sensor is unable to detect the third material for a predetermined amount of time after coupling the removable portion with the chemical detection system.

19. The apparatus of claim 17, wherein the controller is configured to generate the signal when the sensor is unable to detect the third material after the removable portion provides a threshold number of samples of the second reactive material to the chemical detection system.

20. The apparatus of claim 17, further comprising:
a reaction chamber configured to receive an amount of the first reactive material and an amount of the second reactive material;
a reservoir configured to store the first reactive material; and
a pump configured to provide the first reactive material to the reaction chamber.

* * * * *